(No Model.) 4 Sheets—Sheet 1.

G. H. WATSON.

FEED WATER HEATING AND PURIFYING ATTACHMENT FOR BOILERS.

No. 364,453. Patented June 7, 1887.

Attest:
F. H. Schott
A. R. Brown

Inventor
George H. Watson
John C. Sasha atty (No Model.) 4 Sheets—Sheet 2.

G. H. WATSON.
FEED WATER HEATING AND PURIFYING ATTACHMENT FOR BOILERS.

No. 364,453. Patented June 7, 1887.

Attest:
F. H. Schott
A. R. Brown

Inventor:
George H. Watson
per John C. Tasker, atty (No Model.) 4 Sheets—Sheet 3.

G. H. WATSON.
FEED WATER HEATING AND PURIFYING ATTACHMENT FOR BOILERS.

No. 364,453. Patented June 7, 1887.

Attest:
H. H. Schott
A. R. Brown.

Inventor:
George H. Watson
¶r John C. Taskevatty (No Model.) 4 Sheets—Sheet 4.
G. H. WATSON.
FEED WATER HEATING AND PURIFYING ATTACHMENT FOR BOILERS.
No. 364,453. Patented June 7, 1887.

Attest:
F. H. Schott
N. R. Brown

Inventor:
George H. Watson
for John C. Fastievatty.

UNITED STATES PATENT OFFICE.

GEORGE H. WATSON, OF ST. LOUIS, MISSOURI.

FEED-WATER HEATING AND PURIFYING ATTACHMENT FOR BOILERS.

SPECIFICATION forming part of Letters Patent No. 364,453, dated June 7, 1887.

Application filed May 31, 1884. Serial No. 133,362. (No model.)

*To all whom it may concern:*

Be it known that I, GEORGE H. WATSON, a citizen of the United States, residing at St. Louis, in the county of St. Louis and State of Missouri, have invented certain new and useful Improvements in Feed-Water Heating and Purifying Attachments for Steam-Boilers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in steam-boiler attachments and connections, as hereinafter described, whereby hot water from the boiler is conveyed to a sediment-receptacle exterior to the boiler, and there caused to meet and mingle with the feed-water, which may or may not have been previously heated, the object being to effect a precipitation within the sediment-receptacle of the impurities contained in the feed-water, and so purify the same before it is delivered to the boiler and its steam-generating connections.

The invention also consists in the combination, with the sediment-receptacle, of a holder for an anti-incrustation substance and means for controlling the delivery of said substance to the water contained in said receptacle for the purpose of neutralizing or precipitating the impurities that are dissolved or suspended in the feed-water.

The invention further consists in the construction and arrangement of a system of circulating feed-water heating and steam-generating pipes or tubes that connect with the water at both ends of the boiler, as hereinafter more fully set forth.

Figure 1:
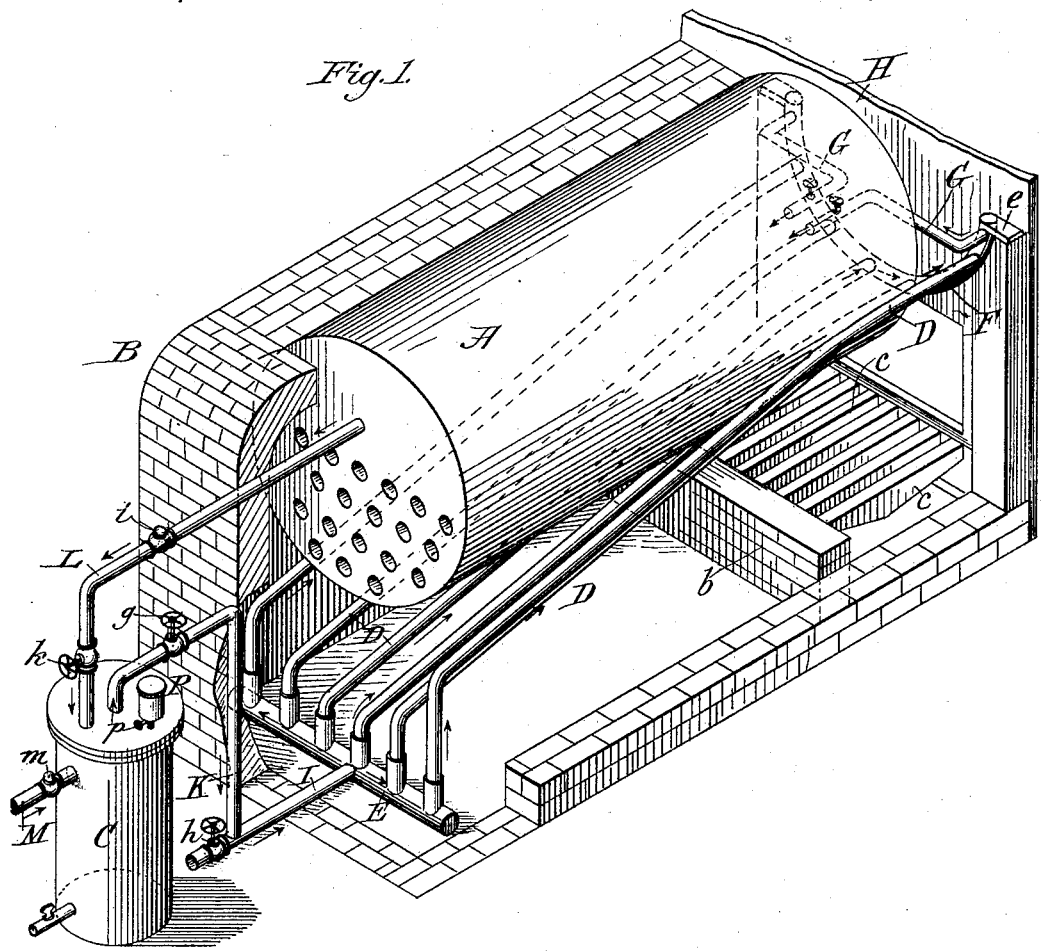
Figure 2:
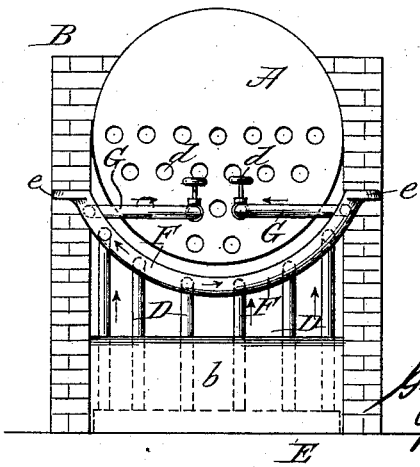
Figure 3:
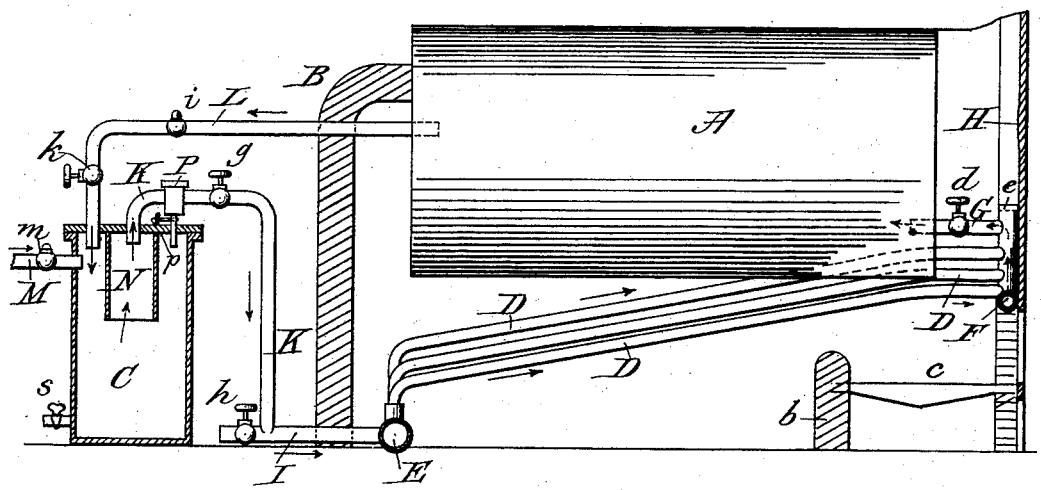
Figure 4:
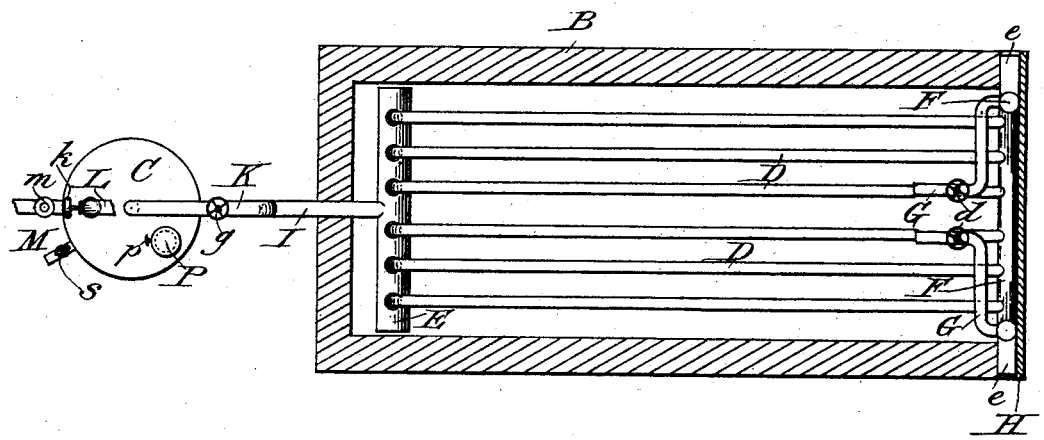
Figure 5:
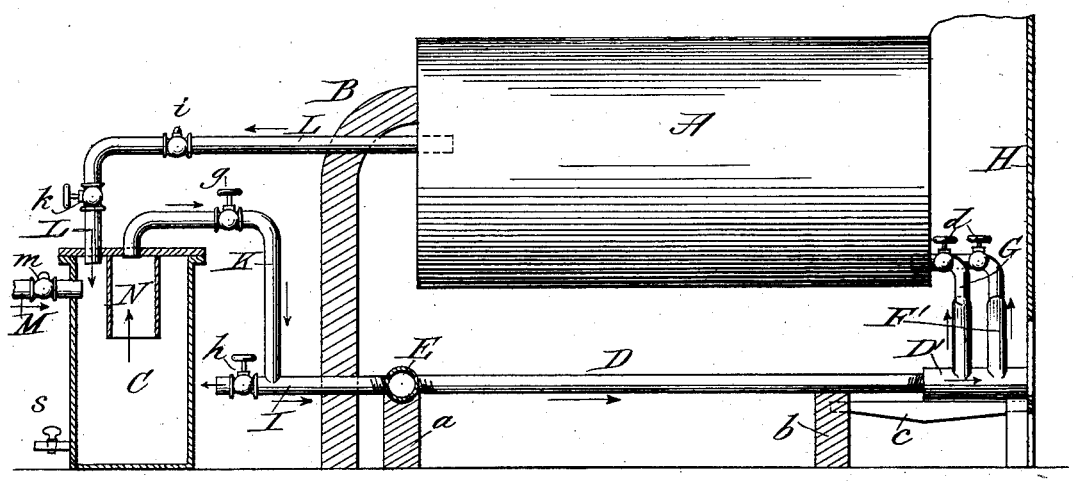
Figure 6:
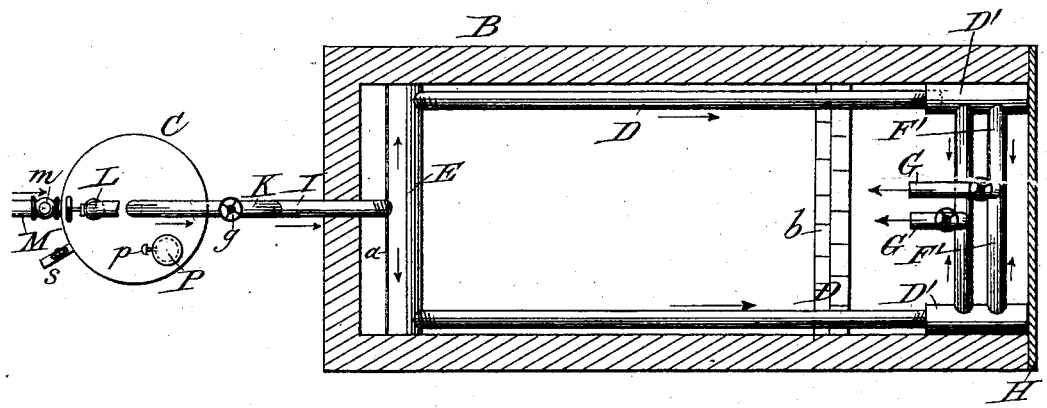
Figure 7:
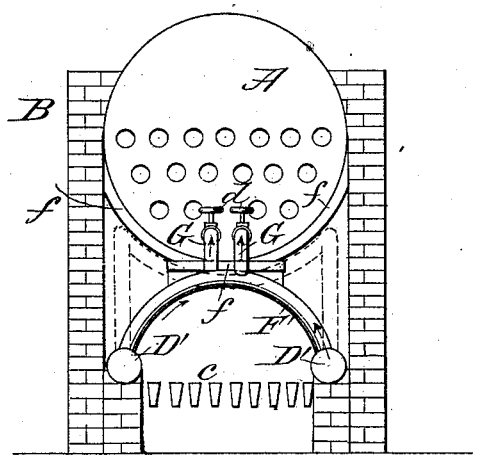
Figure 8:
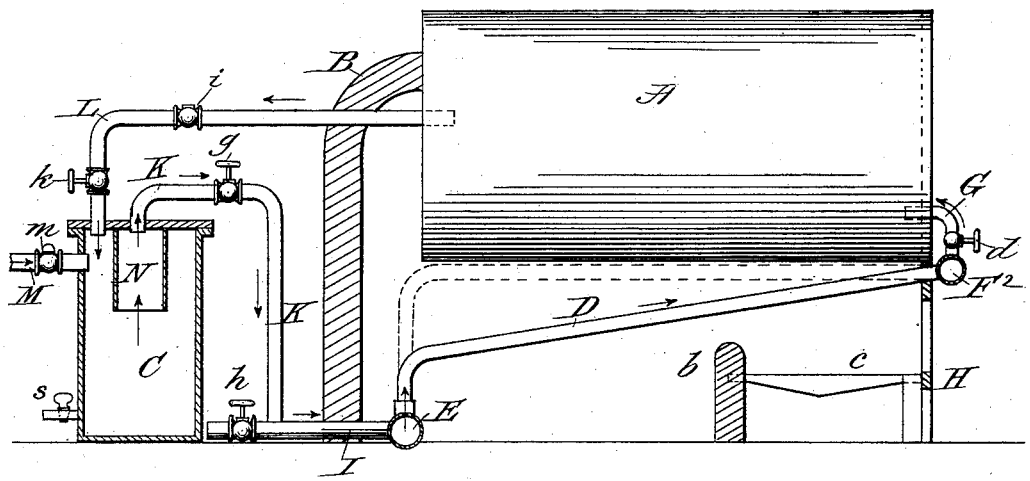

In the annexed drawings, illustrating my invention, Figure 1 is a perspective view of a steam-boiler provided with my improved water-purifying, feed-water heating, circulating, and steam-generating attachments, a portion of the furnace-walls being removed. Fig. 2 is an end view of the boiler, showing the inverted arch and its connections forming part of the feed-water heating and circulating attachments. Fig. 3 is a sectional side view of boiler and connections shown in Figs. 1 and 2. Fig. 4 is a plan view of the same with boiler removed. Fig. 5 is a sectional side view of a boiler and connections, showing a modification in the arrangement of the feed-water heating and circulating pipes. Fig. 6 is a plan view of Fig. 5 with boiler removed. Fig. 7 is an end view of the boiler and connections shown in Fig. 5, and Fig. 8 is a sectional side elevation illustrating another modification in the construction and arrangement of the boiler-connections.

Like letters of reference designate like parts in the several views.

The boiler A is supported in the furnace-walls B in any suitable manner, and is connected with a sediment-receptacle, C, which may be of any suitable form. Beneath the boiler is a series of steam-generating, feed-water heating, and circulating pipes, D D, arranged longitudinally. These pipes communicate with a transverse pipe or drum, E, laid beneath the boiler, as shown in Figs. 1, 3, and 8, or supported on a wall, $a$, on a level with the bridge-wall $b$, as shown in Fig. 5. From the drum E the pipes D D are carried forward above the grate $c$ and connect with a transverse pipe, F, that communicates with the forward end of the boiler by tubes or connections G G, having valves $d$ $d$, as shown in Figs. 1, 2, 3, and 4.

The pipe F is arranged in contact with the fire-front H, and is preferably made in the form of an inverted arch, as shown in Fig. 2. The longitudinal pipes D D, when used in connection with this form of arched pipe, are arranged, as shown in Fig. 1, so as to form an inclined concave bed beneath the boiler. It will be seen that the pipes D D, when arranged in this manner, are inclined gradually upward and forward from the transverse pipe or drum E to the inverted arched pipe F, passing above the bridge-wall and fire-box. Any suitable number of longitudinal pipes D D can be used, and they may be arranged in more or less proximity to each other, as desired. The space between the end of the tubular boiler A and the fire-front H is closed by tile or other fire-proof material laid on the forward ends of the pipes D D, so as to cause the products of combustion to pass beneath and through the boiler before being permitted to escape. When the inverted-arch pipe F is employed, it may be supported by means of lugs or hangers $e\ e$ at each end, which are so arranged as to connect with the furnace-walls.

Instead of arranging the pipes D in an inclined position they may be placed horizontally, as shown in Figs. 5 and 6, or as shown by dotted lines in Fig. 8. These horizontal pipes communicate at their rear ends with the transverse pipe or drum E, as before described. The forward ends of the horizontal pipes D D, as shown in Figs. 5 and 6, may connect with short horizontal drums or enlarged pipes D′ D′, one of which is placed on each side of the fire-box, as shown in Figs. 6 and 7, said drums being connected by arched pipes F′ F′, that communicate with the front end of the boiler by valved pipes or tubes G G, as before described. The arches F′ F′, as shown in Fig. 6, are adapted to support tiles $f\ f$ in the space between the boiler and fire front, for the purpose referred to in connection with the inverted arch shown in Fig. 2. The inverted arch can also be used, if desired, in connection with the horizontal pipes D and drums D′, as shown by dotted lines in Fig. 6.

The transverse pipe or drum E is provided with an inlet-pipe, I, that communicates with the sediment-receptacle C by a pipe, K, having a hand-valve, $g$. On the end of the pipe I is a blow-off cock, $h$. By closing the valve $g$ and opening valve $h$ the pipes beneath the boiler can be blown out when required.

The water in the sediment-receptacle C is connected with the water in the boiler by a pipe, L, having a check-valve, $i$, and a hand-valve, $k$. A feed-pipe, M, having a check-valve, $m$, is connected to the upper part of the sediment-receptacle.

In the upper part of the sediment-receptacle C may be placed a vertical partition, N, having, preferably, a tubular or annular form, as shown in Figs. 3, 5, and 8. The boiler-connection L and feed-pipe M communicate with the sediment-receptacle on one side of the tubular partition N, preferably the outer side, as shown, while the pipe K leads from the top of the receptacle C within the space inclosed by said partition; but it is obvious that this arrangement can be reversed, if desired. It is also apparent that a straight vertical partition can be suspended in the top of the receptacle C, instead of the tubular partition, the inlet and exit pipes being arranged on opposite sides thereof; or the partition can be entirely dispensed with, it being only necessary to provide a receptacle or chamber exterior to the boiler, in which receptacle the feed-water and the hot water from the boiler can be mingled, so as to cause their impurities to be deposited. It will be seen that by this construction the sediment and impurities contained in the feed-water delivered by the pipe M and in the heated water that passes from the boiler through the pipe L will be deposited in the bottom of the receptacle C, while the purified water is conveyed to the boiler through the pipes K I, drum E, pipes D D, arches F, and boiler connections or tubes G G, thus maintaining a constant circulation, during which the water is heated, purified, and converted into steam.

On the top of the sediment-receptacle C is a box or chamber, P, for holding soda or other suitable anti-incrustator, that may be delivered to the receptacle C through a tube controlled by a valve, $p$, as required. The substance used may be placed in the box or holder P in solution, or it can be introduced in a dry state and dissolved therein by opening the valve, so as to allow water to rise in the holder through the tube that connects it with the drum or receptacle C, the valve $p$ being afterward adjusted so as to permit a sufficient quantity of the anti-incrustation solution to pass into the receptacle and neutralize the acids or other impurities the water may contain, thereby purifying the water before it is conveyed to the boiler. A hand-hole or a blow-off cock, $s$, is provided near the bottom of the sediment-receptacle C, through which it can be cleansed when required.

The operation of the boiler-connections and receptacle C in purifying the feed-water before it is introduced to the boiler will be readily understood. The advantage of providing adequate means for maintaining a circulation through the pipes that support the fire-proof material forming the shelf or partition between the boiler and fire-front will also be appreciated. It may be remarked that connection between the pipes D and G can be made either by means of the inverted arch F, shown in Fig. 2, the upright arches F′ F′, Fig. 5, or a straight pipe, F², as shown in Fig. 8. By connecting the feed-water heating and steam-generating pipes with the water in the boiler at both ends thereof and with a sediment-receptacle to which the feed-water is conveyed before entering the boiler, it is obvious that a constant circulation will be maintained, thereby avoiding liability of destroying the pipes by heat and preventing or greatly decreasing the formation of scale in the boiler and its connections.

Having thus described my invention, what I claim as new, and desire to secure by Letters Patent, is—

1. The combination, with a steam-boiler and a sediment-receptacle having an attachment for delivering an anti-incrustator to said receptacle, of a pipe for conveying feed-water to the sediment-receptacle, a pipe for conveying hot water from the boiler to said receptacle, and a pipe or pipes for conveying the purified feed-water from the receptacle to the boiler, substantially as described.

2. The combination, with a steam-boiler, A, and fire-front H, of the longitudinal pipes D D, arranged beneath the boiler and projecting beyond its front end to support a fire-proof material in the space between the boiler and fire-front, substantially as described.

3. The combination, with a steam-boiler and longitudinal pipes D D, of the drums D' D', arches F' F', having boiler-connections G G, provided with valves $d\,d$, for connecting with one end of the boiler, and means for connecting the longitudinal pipes D D with the opposite end of the boiler, substantially as described.

4. The combination, with a steam-boiler, of the longitudinal pipes D D, arched connections F F or F' F', tubes G G, having valves $d\,d$, transverse pipe or drum E, valved pipes I K, sediment-receptacle C, valved pipe L, and feed-pipe M, substantially as described.

In testimony whereof I affix my signature in presence of two witnesses.

GEORGE H. WATSON.

Witnesses:
 A. R. BROWN,
 PHILIP MAURO.